United States Patent
Daigle et al.

(10) Patent No.: US 11,228,038 B2
(45) Date of Patent: Jan. 18, 2022

(54) ELECTRODE MATERIALS AND PROCESSES FOR THEIR PREPARATION

(71) Applicants: HYDRO-QUÉBEC, Montréal (CA); MURATA MANUFACTURING CO., LTD., Nagaokakyo (JP)

(72) Inventors: Jean-Christophe Daigle, St-Bruno-de-Montarville (CA); Yuichiro Asakawa, Tokyo (JP); Shinichi Uesaka, Kyoto (JP); Karim Zaghib, Longueuil (CA)

(73) Assignees: HYDRO-QUÉBEC, Québec (CA); MURATA MANUFACTURING CO., LTD., Kyoto (JP)

(*) Notice: Subject to any disclaimer, the term of this patent is extended or adjusted under 35 U.S.C. 154(b) by 57 days.

(21) Appl. No.: 16/313,306

(22) PCT Filed: Jun. 30, 2017

(86) PCT No.: PCT/CA2017/050801
§ 371 (c)(1),
(2) Date: Dec. 26, 2018

(87) PCT Pub. No.: WO2018/000101
PCT Pub. Date: Jan. 4, 2018

(65) Prior Publication Data
US 2019/0157679 A1  May 23, 2019

Related U.S. Application Data

(60) Provisional application No. 62/356,952, filed on Jun. 30, 2016, provisional application No. 62/436,718, filed on Dec. 20, 2016.

(51) Int. Cl.
*H01M 4/00* (2006.01)
*H01M 4/62* (2006.01)
(Continued)

(52) U.S. Cl.
CPC .......... *H01M 4/622* (2013.01); *H01M 4/131* (2013.01); *H01M 4/136* (2013.01);
(Continued)

(58) Field of Classification Search
CPC .... H01M 4/5825; H01M 4/485; H01M 4/661; H01M 4/131; H01M 4/622
See application file for complete search history.

(56) References Cited

U.S. PATENT DOCUMENTS 9,698,423 B2 * 7/2017 Xu .................. H01M 4/622
2004/0121232 A1  6/2004 Kato et al.
(Continued)

FOREIGN PATENT DOCUMENTS

CA  2778626 A1  2/2013
CN  1986429 A   6/2007
(Continued)

OTHER PUBLICATIONS

Cai et al., "Preparation and Performances of LiFePO4 Cathode in Aqueous Solvent with Polyacrylic Acid as a Binder", Journal of Power Sources, (Apr. 1, 2009), vol. 189, Issue 1, pp. 547-551.
(Continued)

*Primary Examiner* — Cynthia H Kelly
*Assistant Examiner* — Monique M Wills
(74) *Attorney, Agent, or Firm* — Buchanan Ingersoll & Rooney P.C.

(57) ABSTRACT

This application describes an electrode material comprising particles of an electrochemically active material dispersed in a polymer binder, where the polymer binder is an acidic polymer or a mixture comprising a binder soluble in an aqueous solvent or a non-aqueous solvent (e.g. NMP) and an acidic polymer. The application also further relates to pro-
(Continued)

cesses for the preparation of the electrode material and electrodes containing the material, as well as to the electrochemical cells and their use.

21 Claims, 6 Drawing Sheets

(51) Int. Cl.
| | |
|---|---|
| H01M 4/131 | (2010.01) |
| H01M 4/136 | (2010.01) |
| H01M 4/1391 | (2010.01) |
| H01M 4/1397 | (2010.01) |
| H01M 10/0525 | (2010.01) |
| H01M 4/485 | (2010.01) |
| H01M 4/58 | (2010.01) |
| H01M 4/66 | (2006.01) |

(52) U.S. Cl.
CPC ....... *H01M 4/1391* (2013.01); *H01M 4/1397* (2013.01); *H01M 4/485* (2013.01); *H01M 4/5825* (2013.01); *H01M 4/661* (2013.01); *H01M 10/0525* (2013.01); *H01M 2220/20* (2013.01)

(56) References Cited

U.S. PATENT DOCUMENTS

| | | | |
|---|---|---|---|
| 2007/0092796 | A1 | 4/2007 | Matsuda et al. |
| 2009/0142665 | A1 | 6/2009 | Sheem et al. |
| 2013/0034651 | A1* | 2/2013 | Buqa ............... H01M 4/623 427/58 |
| 2013/0330636 | A1* | 12/2013 | Deguchi ........... H01M 10/0569 429/338 |
| 2014/0199475 | A1* | 7/2014 | Tonegawa .......... H01M 4/5825 427/122 |
| 2015/0037672 | A1 | 2/2015 | Yang et al. |
| 2015/0287993 | A1 | 10/2015 | Komaba et al. |
| 2015/0318542 | A1* | 11/2015 | Morozumi ........... H01M 4/587 429/231.8 |
| 2016/0013492 | A1 | 1/2016 | Buqa et al. |
| 2016/0141624 | A1 | 5/2016 | Lee et al. |
| 2016/0164081 | A1 | 6/2016 | Cui et al. |
| 2017/0170465 | A1 | 6/2017 | Kim et al. |

FOREIGN PATENT DOCUMENTS

| | | |
|---|---|---|
| CN | 102290567 A | 12/2011 |
| CN | 105633411 A | 6/2016 |
| GB | 2470190 A | 11/2010 |
| JP | 0521068 A | 1/1993 |
| JP | 2015-128013 A | 7/2015 |
| JP | 2016-58187 A | 4/2016 |
| KR | 10-2009-0053192 A | 5/2009 |
| KR | 10-2013-0016061 A | 2/2013 |
| KR | 10-2016-0024564 A | 3/2016 |
| WO | 2014/065407 A1 | 5/2014 |
| WO | 2014157955 A1 | 10/2014 |
| WO | 2016/038438 A | 3/2016 |

OTHER PUBLICATIONS

Chou et al., "Small things make a big difference: binder effects on the performance of Li and Na batteries", Physical Chemistry Chemical Physics, (Jun. 25, 2014), vol. 16, Issue 38, pp. 20347-20359.
Daigle et al., "A Simple Method for Forming Hybrid Core-Shell Nanoparticles Suspended in Water", Journal of Nanomaterials, (2008, month unknown), vol. 2008, Article ID 609184, 8 pages.
Ding et al., "Towards understanding the effects of carbon and nitrogen-doped carbon coating on the electrochemical performance of Li4Ti5O12 in lithium ion batteries: a combined experimental and theoretical study", Physical Chemistry Chemical Physics, (Sep. 2011), vol. 13, Issue 33, pp. 15127-15133.
Gong et al., "High polar polyacrylonitrile as a potential binder for negative electrodes in lithium ion batteries", Electrochemistry Communications, (Apr. 2013), vol. 29, pp. 45-47.
Guerfi et al., "LiFePO4 water-soluble binder electrode for Li-ion batteries", Journal of Power Sources, (Jan. 2007), vol. 163, Issue 2, pp. 1047-1052.
Lee et al., "A novel and efficient water-based composite binder for LiCoO2 cathodes in lithium-ion batteries", Journal of Power Sources, (Nov. 2007), vol. 173, Issue 2, pp. 985-989.
Loiseau et al., "Synthesis and Characterization of Poly(acrylic acid) Produced by RAFT Polymerization. Application as a Very Efficient Dispersant of CaCO3, Kaolin, and TiO2", Macromolecules, (Apr. 2003), vol. 36, Issue 9, pp. 3066-3077.
Park et al., "Effect of high adhesive polyvinyl alcohol binder on the anodes of lithium ion batteries", Electrochemistry Communications, (Oct. 2011), vol. 13, Issue 10, pp. 1051-1053.
Tran et al., "Adhesive PEG-based binder for aqueous fabrication of thick Li4Ti5O12 electrode", Electrochimica Acta, (Jan. 2013), vol. 88, pp. 536-542.
Wan et al., "Low-Temperature Aluminum Reduction of Graphene Oxide, Electrical Properties, Surface Wettability, and Energy Storage Applications", American Chemical Society Nano, (Sep. 2012), vol. 6, No. 10, pp. 9068-9078.
Yamamoto et al., "SBR Binder (for Negative Electrode) and ACM Binder (for Positive Electrode)", Lithium-Ion Batteries, (2009, month unknown), pp. 163-179.
Zhong et al., "A Versatile Encapsulation Method of Noncovalently Modified Carbon Nanotubes by RAFT Polymerization", Journal of Polymer Science Part A: Polymer Chemistry, (Nov. 2012), vol. 50, Issue 21, pp. 4403-4407.
Lee, J. et al. "Effect of of poly(acrylic acid) on adhesion strength and electrochemical performance of natural graphite negative electrode for lithium-ion batteries" Elsevier, Journal of Power Sources, vol. 16I1, 12006, pp. 612-616.
Supplementary Partial European Search Report dated Dec. 20, 2019, issued by the European Patent Office in corresponding European Application No. EP 17 81 8790, (12 pages).
Office Action (Notice of Reasons for Rejection) dated May 13, 2021, by the Japanese Patent Office in corresponding Japanese Patent Application No. 2018-567915, and an English Translation of the Office Action. (15 pages).
Office Action (Notification of Reason for Refusal) dated Jul. 19, 2021, by the Korean Patent Office in corresponding Korean Patent Application No. 10-2019-7003198, and an English Translation of the Office Action. (17 sages).
International Search Report (PCT/ISA/210) dated Oct. 11, 2017, by the Canadian Patent Office as the International Searching Authority for International Application No. PCT/CA2017/050801.
Written Opinion (PCT/ISA/237) dated Oct. 11, 2017, by the Canadian Patent Office as the International Searching Authority for International Application No. PCT/CA2017/050801.
Rahaman et al., "A Review of Heat Treatment on Polyacrylonitrile Fiber," Polymer Degradation and Stability, (Aug. 2007), vol. 92, Issue 8, pp. 1421-1432.

* cited by examiner

ELECTRODE MATERIALS AND PROCESSES FOR THEIR PREPARATION

RELATED APPLICATION

This application claims priority to U.S. provisional application No. 62/356,952 filed on Jun. 30, 2016, and U.S. provisional application No. 62/436,718 filed on Dec. 20, 2016, the content of which is incorporated herein by reference in its entirety for all purposes.

TECHNICAL FIELD

The technical field generally relates to electrode materials and processes for their preparation, for instance, electrode materials using a binder containing an acidic polymer or a water-soluble binder and an acidic polymer. The present application also relates to the use of the electrode materials for the preparation of electrodes and their use in electrochemical cells, e.g. lithium-ion batteries.

BACKGROUND

Polymeric binders are widely used in electrochemistry to provide cohesion and adhesion of the active materials on the electrode's current collector. These binders are electrochemically inactive and chemically inert. They are also known to contribute significantly to the mass and stability of the battery (Yamamoto, H. et al., Lithium-Ion Batteries: Science and Technologies, Springer New York, 2009; pp 163-179, incorporated herein by reference).

The most commonly used polymer binder is poly(vinyl difluoride) (PVDF). This polymer is normally dissolved in a toxic solvent namely, the N-methyl-2-pyrrolidone (NMP) having a very high boiling temperature (202° C.) before combining it with active material particles and applying the mixture on the current collector ((a) Guerfi, A. et al., *J. of Power Sources*, 2007, 163 (2), 1047-1052; (b) Lux, S. F. et al., *J. of The Electrochem. Soc.*, 2010, 157 (3), A320-A325, incorporated herein by reference). Although this polymer is effective as a binder and electrochemically inert, it has significant drawbacks for its industrial use, for instance as to costs of production and costs related to the evaporation of the solvent after the coating of the electrodes, which requires a significant amount of energy (see Lux et al., Supra). Moreover, the battery's electrolyte in contact with PVDF induces the formation of lithium fluoride, which accelerates the chemical degradation of the binder (see Guerfi et al., Supra) thus, increasing the degradation rate of the battery and the cell's life accordingly.

Another polymeric binder used is a mixture of styrene-butadiene rubber (SBR) and methyl cellulose (CMC). SBR promotes the adhesion on the current collector while the CMC thickens the dispersion and enhances the adhesion between the active material particles (see Guerfi et al., Supra). This mixture is very effective in the case of $LiFePO_4$ and LTO (Chou, S. L. et al., *Phys. Chem. Chem. Phys.*, 2014, 16(38), 20347-20359, incorporated herein by reference) but ineffective with LCO (Lee, J.-T. et al., *J. of Power Sources*, 2007, 173(2), 985-989, incorporated herein by reference). This mixture is also electrochemically inactive and does not positively contribute to the battery's efficiency.

Poly(acrylonitrile) (PAN), poly(acrylic acid) (PAA) and poly(vinyl alcohol) (PVA) have also been used in the past as polymeric binders for electrodes ((a) Cai, Z. P. et al., *J. of Power Sources*, 2009, 189(1), 547-551; (b) Gong, L. et al., *Electrochem. Comm.*, 2013, 29, 45-47; (c) Park, H. -K. et al., *Electrochem. Commun.*, 2011, 13(10), 1051-1053, incorporated herein by reference). However, the lack of flexibility (higher glass transition) of these polymers was a major drawback because the electrode would form cracks upon extensive cycling (Tran, B. et al., *Electrochim. Acta*, 2013, 88, 536-542, incorporated herein by reference).

Accordingly, the use of a polymer soluble in an environmentally friendly solvent having a lower boiling point like water would be a beneficial improvement for the manufacturing of electrodes. Additionally, it would also be desirable for a binder to enhance the dispersion of the active materials and contribute to the ionic and/or electronic conductivities of the electrode. For instance, an increase in ionic conductivity may help reducing the internal resistance of the electrode, thus enabling the transport of lithium.

Furthermore, as the use of activated carbon (Ding, Z. et al., *Phys. Chem. Chem. Phys.*, 2011, 13(33), 15127-15133, incorporated herein by reference) as a coating on the surface of active materials can create a reaction on the surface of the aluminum collector (Wan, D. et al., *ACS Nano*, 2012, 6(10), 9068-9078, incorporated herein by reference), it would also be desirable to find a polymer binder which would protect the interface between the current collector and the electrochemically active material within the dispersion.

SUMMARY

According to one aspect, the present application relates to an electrode material comprising particles of an electrochemically active material dispersed in a binder, wherein the binder is a mixture comprising an aqueous binder (i.e. a binder soluble in an aqueous solvent) and an acidic polymer, wherein the aqueous binder is not an acidic polymer. For example, the acidic polymer is selected from poly(acrylic acid) (PAA), poly(methacrylic acid) (PMAA) and combinations thereof, or the acidic polymer is poly(acrylic acid) (PAA). For instance, the acidic polymer has an average molecular weight within the range of from about 200 000 g/mol to about 600 000 g/mol.

In one embodiment, the aqueous binder used in the present material is selected from SBR (styrene butadiene rubber), NBR (butadiene acrylonitrile rubber), HNBR (hydrogenated NBR), CHR (epichlorohydrin rubber), ACM (acrylate rubber), and combinations thereof, for instance, the aqueous binder comprises SBR or is SBR. For example, wherein the ratio of aqueous binder to acidic polymer is within the range of from about 1:8 to about 8:1, or from about 1:5 to about 5:1, or from about 1:3 to about 3:1. In one embodiment, the binder further comprises lithium ions, for instance, from a lithium-containing base such as lithium hydroxide.

In one embodiment, the electrochemically active material in the particles comprises a material selected from the group consisting of titanates, lithium titanates, lithium metal phosphates, vanadium oxides, lithium metal oxides, and combinations thereof. For instance, the electrochemically active material may be selected from $TiO_2$, $Li_2TiO_3$, $LiaTi_5O_{12}$, $H_2Ti_5O_{11}$ and $H_2Ti_4O_9$, or a combination thereof, $LiM'PO_4$ wherein M' is Fe, Ni, Mn, Co, or a combination thereof, $LiV_3O_8$, $V_2O_5$, $LiMn_2O_4$, $LiM''O_2$, wherein M'' is Mn, Co, Ni, or a combination thereof, $Li(NiM''')O_2$, wherein M''' is Mn, Co, Al, Fe, Cr, Ti, or Zr, and combinations thereof. In one embodiment, the electrochemically active material is selected from lithium titanates and lithium metal phosphates, e.g. $Li_4Ti_5O_{12}$ or $LiFePO_4$.

In another embodiment, particles further comprise a carbon coating, for instance a nano-layer of carbon comprising fibers on the surface of the particles. In a preferred embodiment, the carbon coating comprises graphene-type polyaromatic structures incorporating heteroatoms, for instance, oxygen atoms, nitrogen atoms, sulfur atoms or a combination thereof, for instance, the heteroatoms comprise nitrogen atoms.

According to another aspect, the present application relates to an electrode material comprising particles of an electrochemically active material dispersed in a binder, wherein the binder is an acidic polymer. For example, the acidic polymer is selected from poly(acrylic acid) (PAA), poly(methacrylic acid) (PMAA) and combinations thereof, or the acidic polymer is poly(acrylic acid) (PAA). For instance, the acidic polymer has an average molecular weight within the range of from about 200 000 g/mol to about 600 000 g/mol. In one embodiment, the particles of active material are defined herein. In one embodiment, the binder further comprises lithium ions.

In one embodiment, the electrochemically active material in the particles comprises a material selected from the group consisting of titanates, lithium titanates, lithium metal phosphates, vanadium oxides, lithium metal oxides, and combinations thereof. For instance, the electrochemically active material may be selected from $TiO_2$, $Li_2TiO_3$, $LiaTi_5O_{12}$, $H_2Ti_5O_{11}$ and $H_2Ti_4O_9$, or a combination thereof, $LiM'PO_4$ wherein M' is Fe, Ni, Mn, Co, or a combination thereof, $LiV_3O_8$, $V_2O_5$, $LiMn_2O_4$, $LiM''O_2$, wherein M'' is Mn, Co, Ni, or a combination thereof, $Li(NiM''')O_2$, wherein M''' is Mn, Co, Al, Fe, Cr, Ti, or Zr, and combinations thereof. In one embodiment, the electrochemically active material is selected from lithium titanates and lithium metal phosphates, e.g. $Li_4Ti_5O_{12}$ or $LiFePO_4$. In one embodiment, the particles further comprise a carbon coating, for example, a nano-layer of carbon comprising fibers on the surface of the particles. In one example, the carbon coating comprises a polyaromatic structure of graphene-type comprising heteroatoms, e.g. oxygen, nitrogen, sulfur or a combination thereof.

In another aspect, the present technology relates to an electrode material comprising particles of an electrochemically active material dispersed in a polymer binder, wherein the polymer binder is a mixture comprising a non-aqueous (unreactive organic) binder and an acidic polymer. For example, the acidic polymer is selected from poly(acrylic acid) (PAA), poly(methacrylic acid) (PMAA) and combinations thereof, or the acidic polymer is poly(acrylic acid) (PAA). For instance, the acidic polymer has an average molecular weight within the range of from about 200 000 g/mol to about 600 000 g/mol.

In one embodiment, the non-aqueous binder is selected from fluorinated binders (e.g. PVDF, PTFE, and the like). For instance, the fluorinated binder comprises or is PVDF. In one embodiment, the ratio (non-aqueous binder):(acidic polymer) is within the range of from about 1:8 to about 8:1, or from about 1:5 to about 5:1, or from about 1:3 to about 3:1.

In another embodiment, the electrochemically active material in the particles comprises a material selected from the group consisting of titanates, lithium titanates, lithium metal phosphates, vanadium oxides, lithium metal oxides, and combinations thereof. For instance, the electrochemically active material may be selected from $TiO_2$, $Li_2TiO_3$, $Li_4Ti_5O_{12}$, $H_2Ti_5O_{11}$ and $H_2Ti_4O_9$, or a combination thereof, $LiM'PO_4$ wherein M' is Fe, Ni, Mn, Co, or a combination thereof, $LiV_3O_8$, $V_2O_5$, $LiMn_2O_4$, $LiM''O_2$, wherein M'' is Mn, Co, Ni, or a combination thereof, $Li(NiM''')O_2$, wherein M''' is Mn, Co, Al, Fe, Cr, Ti, or Zr, and combinations thereof. In one embodiment, the electrochemically active material is selected from lithium titanates and lithium metal phosphates, e.g. $Li_4Ti_5O_{12}$ or $LiFePO_4$. In one embodiment, the particles further comprise a carbon coating, for example, a nano-layer of carbon comprising fibers on the surface of the particles. In one example, the carbon coating comprises a polyaromatic structure of graphene-type comprising heteroatoms, e.g. oxygen, nitrogen, sulfur or a combination thereof.

According to another aspect, the present application relates to a process for producing an electrode comprising the electrode material as herein defined comprising the steps of: (a) mixing, in any order, the particles of electrochemically active material, the aqueous binder and the acidic polymer in an aqueous solvent to obtain a slurry, (b) casting the slurry of step (a) on a current collector, and (c) drying the casted slurry to obtain an electrode. In one embodiment, the process further comprises a step of neutralizing the acidic polymer prior to step (a) with a lithium-containing base such as lithium hydroxide.

According to a further aspect, the present application relates to a process for producing an electrode comprising an electrode material as herein defined, comprising the steps of: (a) mixing, in any order, particles of electrochemically active material and the acidic polymer in a solvent to obtain a slurry; (b) casting the slurry of step (a) on a current collector, and (c) drying the casted slurry to obtain an electrode. In one embodiment, the solvent is an aqueous solvent, e.g. water. The process may further comprise a step of neutralizing the acidic polymer prior to step (a) with a lithium-containing base such as lithium hydroxide. In another embodiment, the solvent is an unreactive organic solvent compatible with the elements of the electrode material, e.g. NMP. In a further embodiment, the current collector is aluminum or an alloy having aluminum as the main component.

According to yet another aspect, the present technology relates to a process for producing an electrode comprising an electrode material as herein defined, comprising the steps of: (a) mixing, in any order, particles of electrochemically active material, the non-aqueous binder and the acidic polymer in an unreactive organic solvent to obtain a slurry; (b) casting the slurry of step (a) on a current collector, and (c) drying the casted slurry to obtain an electrode. In one embodiment, the unreactive organic solvent is NMP. In a further embodiment, the current collector is aluminum or an alloy having aluminum as the main component.

The present application also further relates to an electrode comprising the electrode material as herein defined, on a current collector, or an electrode produced by a process of the present application. Electrochemical cells comprising an electrode as herein defined, an electrolyte and a counter-electrode are also contemplated as well as their use, for example, in electrical or hybrid vehicles, or in ubiquitous IT devices.

Other features and advantages of the present technology will be better understood upon reading of the description herein below with reference to the appended drawings.

DETAILED DESCRIPTION

Figure 1:
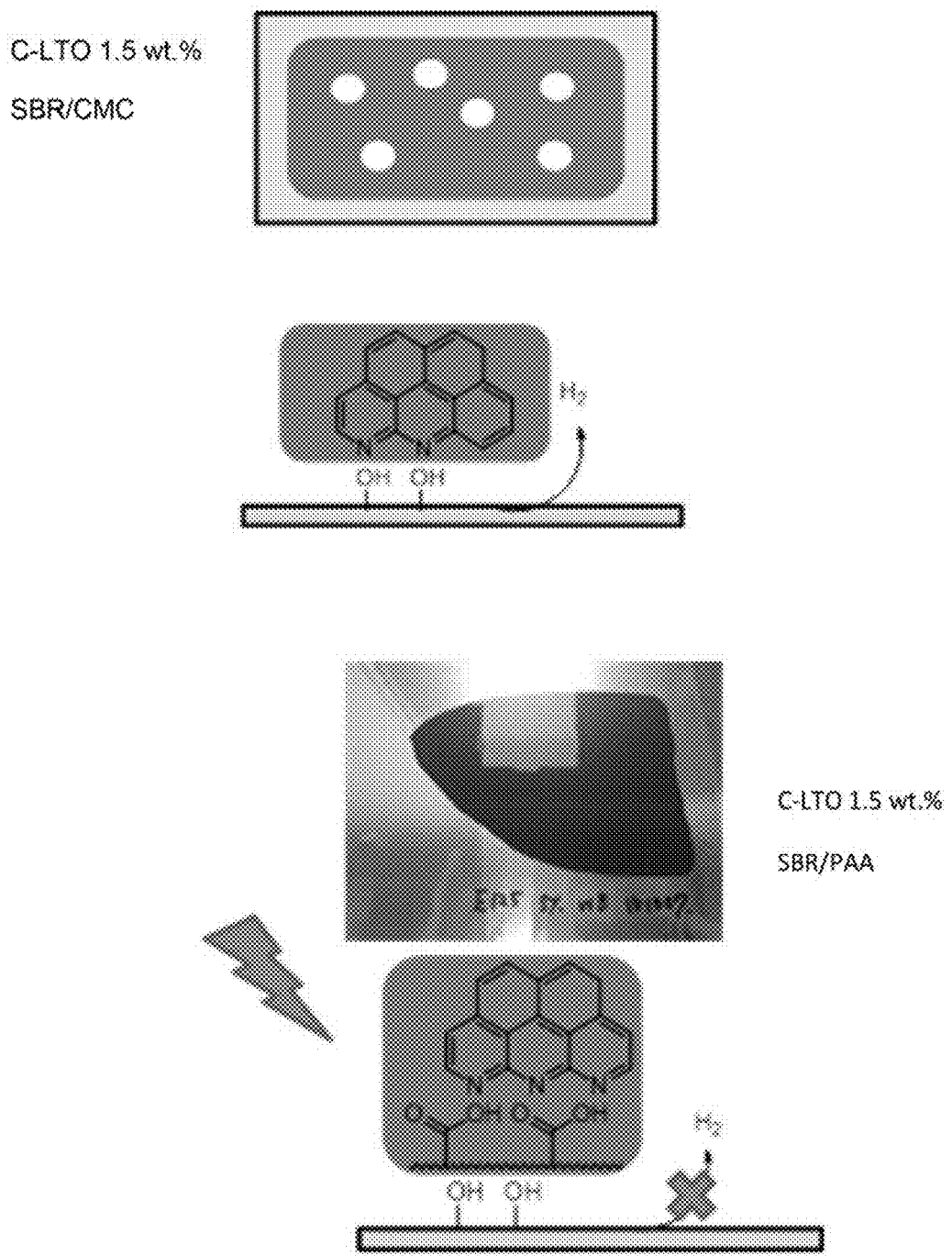
FIG. 1 is a schematic illustration of an embodiment of the present application using an SBR/PAA binder (bottom), compared to the use of an SBR/CMC binder (top).

This application relates to a process for the preparation of electrode materials, more specifically, comprising particles of an electrochemically active material dispersed in a binder comprising an acidic polymer binder. This application also relates to a process for the preparation of electrode material comprising particles of an electrochemically active material dispersed in a binder mixture comprising a binder soluble in an aqueous solvent and an acidic polymer binder, or a binder mixture comprising a binder soluble in a non-aqueous solvent and an acidic polymer binder.

Examples of acidic polymer binders include poly(acrylic acid) (PAA), poly(methacrylic acid) (PMAA) or combinations thereof. The slurry to be coated optionally includes additional components such as inorganic particles, ceramics, salts (e.g. lithium salts), conductive materials, and the like. In one embodiment, no additional carbon source is added to the slurry before its coating on the current collector. Examples of binders soluble in aqueous solvents include SBR (Styrene Butadiene Rubber), NBR (butadiene acrylonitrile rubber), HNBR (hydrogenated NBR), CHR (epichlorohydrin rubber), ACM (acrylate rubber), and the like, or any combination of two or more of these. Examples of binders soluble in non-aqueous (unreactive organic) solvents include ethers, esters, carbonate esters, nitriles, amides, alcohols, nitromethane, 3-methyl-2-oxazolidinone, N-methyl-2-pyrrolidone (NMP) or a mixture thereof, e.g. NMP.

The particles include inorganic particles of electrochemically active materials, such as metal oxides and complex oxides and other known active materials. Examples of electrochemically active materials include, without limitation, titanates and lithium titanates (e.g. $TiO_2$, $Li_2TiO_3$, $Li_4Ti_5O_{12}$, $H_2Ti_5O_{11}$, $H_2Ti_4O_9$, and the like, or a combination thereof), lithium metal phosphates (e.g. $LiM'PO_4$ where M' is Fe, Ni, Mn, Co, or a combination thereof), vanadium oxides (e.g. $LiV_3O_8$, $V_2O_5$, and the like), and other lithium and metal oxides such as $LiMn_2O_4$, $LiM''O_2$ (M'' being Mn, Co, Ni, or a combination thereof), $Li(NiM''')O_2$ (M''' being Mn, Co, Al, Fe, Cr, Ti, Zr, and the like, or a combination thereof), or a combination thereof. The particles are freshly formed or are obtained from a commercial source and may be microparticles or nanoparticles.

For example, the particles further include a carbon coating, such as a nano-layer of activated carbon. For instance, the average thickness of an amorphous carbon layer may be below 20 nm, or below 10 nm, e.g. around 1.0-1.5 nm. The activated carbon layer may comprise fibers and/or fused aromatic rings comprising carbon atoms and heteroatoms. For instance, the activated carbon layer comprises graphene oxide or a nitrogen-containing graphene-like structure. For instance, the coating may comprise about 4 wt. % to about 15 wt. %, or about 6 wt. % to about 11 wt. %, of nitrogen, the rest being carbon.

Also, the surface area of the coated particles may be between about 2 $m^2/g$ and about 20 $m^2/g$, or between about 4 $m^2/g$ and about 15 $m^2/g$, or between about 6 $m^2/g$ and about 10 $m^2/g$, as determined by BET surface area analysis.

The present application also relates to the preparation of an electrode comprising the electrode material as defined herein. In one example, the electrochemically active particles are mixed with the binder and casted on a current collector, for instance, as a slurry in a solvent, which is dried after casting. When the binder is a mixture comprising a water-soluble binder and an acidic polymer binder, then the solvent is an aqueous solvent. On the other hand, when the binder is an acidic polymer binder, then the solvent may be an aqueous or unreactive organic solvent such as NMP. Where the binder is a mixture of a non-aqueous binder and an acidic polymer binder, the solvent may be an unreactive organic non-aqueous solvent, e.g. NMP. The binder is selected considering the compatibility with the electrochemically active material, the current collector, the electrolyte, and other parts of the electrochemical cell which could be in contact with the binder.

The electrode produced by the present process is for use in the assembly of an electrochemical cell further comprising an electrolyte and a counter-electrode. The material composing the counter-electrode is selected as a function of the material used in the electrode. The electrolyte may be a liquid, gel or solid polymer electrolyte and comprises a lithium salt and/or is conductive to lithium ions.

One example of the present application contemplates the use of PAA (200 000-500 000 g/mol) in NMP or as a mixture with another binder as defined above, such as SBR or PVDF, in adjusted proportions for enhancing the dispersion of active materials in water to further increase the electrochemical performance of the electrode. It was shown that the addition of SBR or PVDF (or a related binder) or the use of PAA in NMP reduce the glass transition effect and brittleness of previously reported PAA containing electrodes. As PAA is an acidic polymer, the acid groups may also be neutralized with a lithium base (e.g. 50 mol %) to further reduce the binder's resistance to lithium ion diffusion in the electrode, for instance, when the material is prepared in an aqueous solvent.

For instance, a mixture of PAA and SBR or PVDF as binder improves the performance of LFP, LTO, LTO-activated carbon coating and activated carbon sources (graphene oxide, carbon doped, etc.). Furthermore, it was also demonstrated that a mixture of PAA in NMP as binder also improves the performance of LFP and LTO.

Another example of the present application contemplates the use an acidic polymer as sole binder, for instance PAA (200 000-500 000 g/mol), in a concentration adjusted for enhancing the dispersion of active materials and/or further increase the electrochemical performance of the electrode. As PAA is an acidic polymer, the acid groups may also be neutralized with a lithium base (e.g. 50 mol %) to further reduce the binder's resistance to lithium ion diffusion in the electrode. For instance, the concentration in acidic polymer binder like PAA in the electrode material may be between about 1 and 8%, for instance, between about 3 and 6%, or between about 4 and 5%.

The carbon coating materials produced using activated carbon (e.g. nitrogen-containing graphene-type carbon) enhance the performances of LTO anodes. Also, the use of graphene oxide could increase the electronic conductivity of the electrode when compared to carbon powder. However, activated carbon and graphene oxide react with aluminum current collectors to release hydrogen in the presence of water based binders such as a mixture of SBR and CMC (see Wan D. et al., Supra). The use of poly(acrylic acid) (PAA) instead of CMC prevents this contact.

It is believed that PAA (or another acidic polymer such as PMAA) acts as a surfactant since its backbone is hydrophobic and its acid groups are hydrophilic. The polymer auto-assembles in the presence of particles coated with nitrogen-containing activated carbon or graphene oxide. This finding was further supported by the use of PAA as a polymeric surfactant for the dispersion of various inorganic particles such as $Al_2O_3$, $TiO_2$, carbon nanotubes, molybdenum, etc. (see Loiseau, J. et al., *Macromolecules*, 2003, 36(9), 3066-3077; Daigle, J. -C. et al., *Journal of Nanomaterials*, 2008, 8, and Zhong, W. et al., *Journal of Polymer Science Part A: Polymer Chemistry*, 2012, 50(21), 4403-4407, each incorporated by reference in their entirety for all purposes). PAA acts as a surfactant on the surface and the acid groups from the polymer stabilize the dispersion of particles in water. Samsung has also used low molecular weight PAA for dispersing Si and Sn based materials (Lee, S. et al., US Patent Application Publication No 2016/0141624, incorporated herein by reference in its entirety for all purposes).

As such, PAA's backbone would be located near the current collector while its acidic groups would neutralize the basic groups in carbon sources. As a result, the present material prevented gas generation. FIG. 1 shows a schematic view of the process. In that particular case, no additional carbon was necessary.

EXAMPLES

The following non-limiting examples are illustrative embodiments and should not be construed as limiting the scope of the present application. These examples will be better understood with reference to the accompanying figures.

Example 1

Preparation of C-LTO

LTO (20 g) was introduced in a 250 mL round bottom flask and stirred by magnetic agitation. Then 100 mL of nanopure water were added to the active material in the flask. The slurry obtained was sonicated at a power of 70% for 6 min. After sonication, the slurry was cooled in an ice bath. A solution of 3 g of acrylonitrile and 25 mg of AIBN was added to the flask. The resulting slurry (13% wt of monomer) was sonicated for another 6 min at the same power. The slurry was then degassed for 30 min using a stream of nitrogen. The slurry was then heated to 70° C. for 12 hours with high stirring under nitrogen.

The slurry obtained in the previous step was heated to 180° C. After heating, the slurry was dried by spray-drying using a pump at 25% and a blower at 95-100%, percentages of the apparatus' full power.

The dried particles were then carbonized under air using a temperature ramp of from 25° C. to 240° C. at a rate of 5° C. $min^{-1}$, and further kept at 240° C. for 1 hour. Then the temperature was raised to 700° C. with a rate of 5° C. $min^{-1}$ under an atmosphere of Argon:$CO_2$ (75:25) or nitrogen.

Example 2

Performance at High Current for C-LTO/SBR/PAA

The C-LTO material prepared by the process of Example 1 was mixed with Styrene-Butadiene Rubber (SBR) binder (48% water solution) and CMC (1.5% water solution) or PAA (250 000-500 000 g/mol) to form a slurry. The solid ratio of C-LTO/SBR/(CMC or PAA) was 96.0/2.5/1.5 (for a 1.0 wt % dry content in carbon from the coating). The resulting slurry was coated on an aluminum foil with a thickness of 15 microns.

LFP-LTO coin cells were then assembled with the following configurations:
Cell type: 2032 size coin cell
Cathode: $LiFePO_4$ (LFP):Carbon Black:PVdF=90:5:5
Anodes:
"Reference": $Li_4Ti_5O_{12}$ (LTO):Carbon Black:SBR:CMC=91:5:2.5:1.5
"C-LTO 1% CMC": 1 wt. % C—$Li_4Ti_5O_{12}$ (LTO):SBR:CMC=96:2.5:1.5
"C-LTO 1% PAA": 1 wt. % C—$Li_4Ti_6O_{12}$ (LTO):SBR:PAA=96:2.5:1.5
Separator: Polyetylene based, 16 μm
Electrolyte: 1 mol/kg $LiPF_6$ PC/DMC/EMC (4/3/3)
Cell performances for the three cells obtained were tested and compared. Prior to the cycling test, the batteries were charged and discharged twice at 0.2 C at a temperature of 25° C. ("xC" being defined as the current that can charge/discharge the full cell capacity in 1/x hour). Conditions used:
Charge: CC-CV (constant current constant voltage) mode
Voltage: 2.4 V, Current: 0.2 C, Cut off current: 0.03 mA
Discharge: CC (constant current) mode
Cut off voltage: 0.5 V, Current: 0.2 C The effect of PAA on the power performance was evaluated by load tests. LFP-LTO coin cells were assembled and cycled (charged and discharged) at 0.2 C, 1 C, 4 C, 10 C. After cycling at xC (x=0.2, 1.0, 4.0, 10.0), the battery was cycled at 0.2 C for a full charge and discharge. For instance, 1 C is the current that can charge or discharge the full capacity of the cell in 1 hour. 2 C is for 30 minutes, 4 C is for 15 minutes, and 10 C is for 6 minutes.

For the charge load test, after a full discharge at 0.2 C, the LFP-LTO cells were charged at 1 C and then charged again at 0.2 C. Then the cells were discharged at 0.2 C and charged at 2 C.

For the discharge load test, after full charge at 0.2 C, the LFP-LTO cells were discharged at 1 C and then discharged again at 0.2 C. The cells were then charged at 0.2 C and discharged at 2 C.

Capacity retentions were calculated using Equation 1:

Capacity retention=(Capacity at *x* C)/(Capacity at 0.2 C)×100   Equation 1

The capacity in the CC region was used for calculations of charge load characteristics. The results of the load tests are shown in Table 1. Conditions used:

Charge: CC-CV (constant current constant voltage) mode
Voltage: 2.4 V, Current: xC, Cut off current: 0.03 mA
Discharge: CC (constant current) mode
Cut off voltage: 0.5 V, Current: xC

TABLE 1

Charge and Discharge capacities

|  |  | 0.2 C | 1 C | 2 C | 4 C | 10 C |
|---|---|---|---|---|---|---|
| Reference (SBR/CMC) | Charge | 100 | 91.9 | 86.9 | 78.9 | 27.4 |
|  | Discharge | 100 | 94.1 | 90.3 | 84.6 | 71.7 |
| C-LTO 1.0 wt. % | Charge | 100 | 97.0 | 91.7 | 84.8 | 48.4 |
| (SBR/CMC) | Discharge | 100 | 91.3 | 86.2 | 76.4 | 63.2 |
| C-LTO 1.0 wt. % | Charge | 100 | 96.3 | 91.4 | 85.0 | 63.5 |
| (SBR/PAA) | Discharge | 100 | 95.5 | 93.4 | 81.2 | 80.0 |

Even though no additional conductive agent (e.g. carbon black) was included in the C-LTO 1% CMC electrode, it showed compatible performance at high current such as 4 C or 10 C. However, the C-LTO 1% PAA electrode showed better capacity retention compared to the reference at 4 C and 10 C, for both the charge and the discharge. The presence of PAA in the binder would thus play a significant role in enhancing transportation of lithium through a better coordination.

Example 3

Resistance Properties for LFP/SBR/PAA

LFP-Li coin cells were then assembled with the following configurations:
Cell type: 2032 size coin cell
Cathode: "Reference": LiFePO$_4$ (LFP):Carbon Black: PVdF=90:5:5
  "LFP CMC": LFP:Carbon Black:SBR:CMC=91.0:5.0: 2.5:1.5
  "LFP PAA": LFP:Carbon Black:SBR:PAA=91.0:5.0:1.0: 3.0
  "LFP PAA-Li": LFP:Carbon Black:SBR:PAA-Li=91.0: 5.0:1.0:3.0
Anode: Li metal
Electrolyte: 1 mol/kg LiPF$_6$ PC/DMC/EMC (4/3/3)

The three first cathodes were prepared as in Example 2, replacing LTO by LFP. LFP PAA-Li was prepared by the following steps:
PAA (450 000 g/mol) was dissolved in water at a concentration of 14.7 wt %. About 50 mol % of the polymer's acid groups were neutralized by LiOH.H$_2$O. The solution was stirred for 4 hours at 80° C. and then for 12 hours at room temperature to ensure the complete dissolution and neutralization of the polymer. The LFP-PAA-Li electrode was prepared in the same way then the LFP-PAA electrode using PAA-Li in replacement of PAA.

Prior to the cycling test, batteries were charged and discharged twice at 0.2 C at a temperature of 25° C.:
Charge: CC-CV (constant current constant voltage) mode
Voltage: 3.8 V, Current: 0.2 C, Cut off current: 0.03 mA
Discharge: CC (constant current) mode
Cut off voltage: 2.0 V, Current: 0.2 C Electrochemical impedance spectroscopy (EIS) was performed using the LFP-Li coin cell mentioned above at a state of charge (SOC)=50% and compared with the other cells (Frequency: 1 MHz-10 mHz, AC amplitude: 10 mV).

Figure 2:
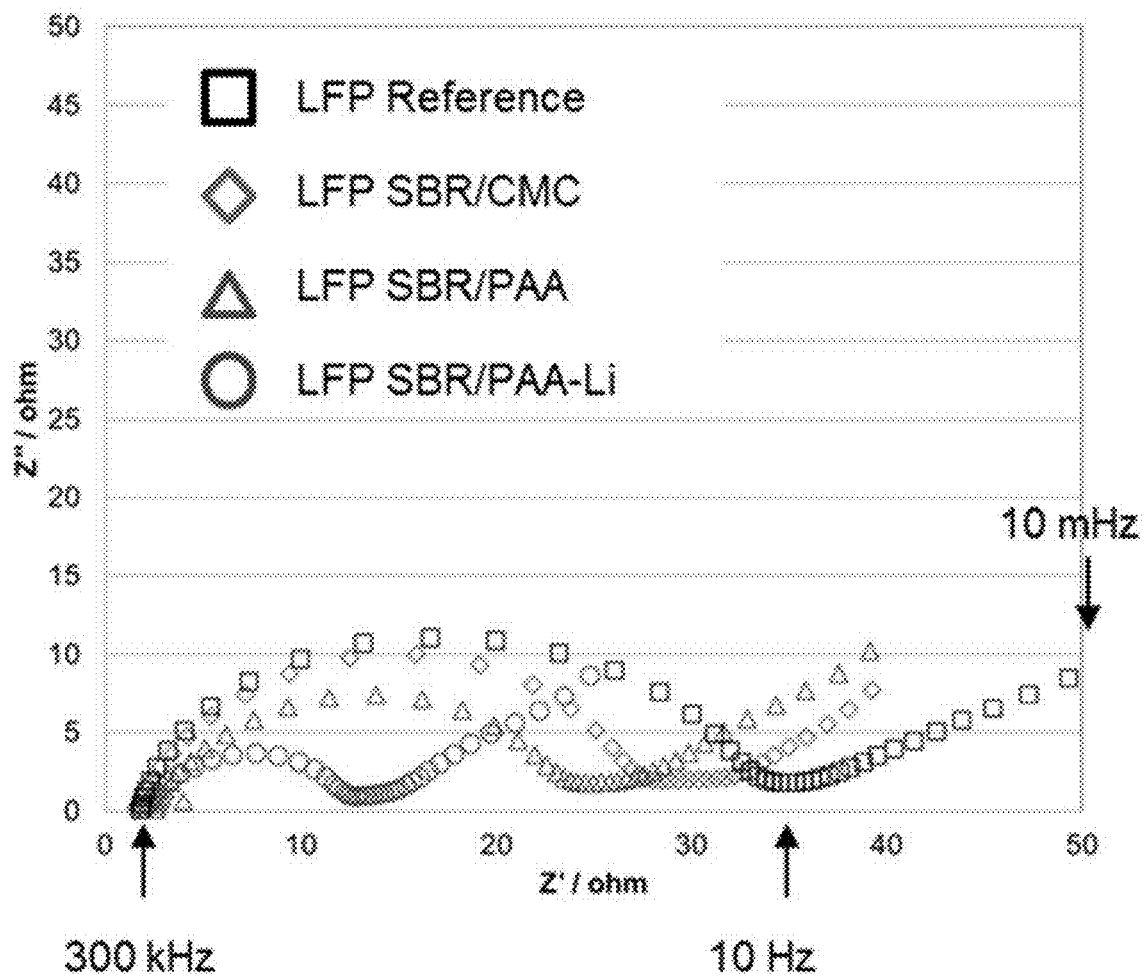
FIG. 2 displays Nyquist plots of LFP electrodes comprising SBR/PAA or SBR/PAA-Li binders according to embodiments of the present application, compared to reference electrodes as detailed in Example 2.

FIG. 2 shows the Nyquist plot of the various cells. When using CMC, the resistance is decreased as compared to the reference cell. On the other hand, the replacement of CMC with PAA showed a reduced reaction resistance compared to CMC. The use of PAA-Li showed further improved results, where reaction resistance was less than half of the resistance obtained with the reference. The addition of lithium ions in the binder would further improves the transport of lithium through the creation of lithium channels within the PAA matrix.

Example 4

Influence of PAA on the Capacity, Efficiency and Capacity Retention for LFP and LTO Cells The electrodes were prepared as in Example 2 and 3, replacing water with NMP when PVDF was used. When the composition of the electrodes is not presented in Example 2 or 3 the compositions are as follow:
Cathode:
  "LFP PAA-NMP" (FIG. 3): LFP:Carbon Black: PAA=91.0:5.0:4.0 (prepared in NMP)
  "LFP PAA-NMP" (FIG. 6): LFP:Carbon Black: PAA=90.0:5.0:5.0 (prepared in NMP)
Anodes:
  "LTO PVDF": LTO:Carbon Black:PVDF=90:5:5
  "LTO PAA-NMP" (FIG. 4): LFP:Carbon Black: PAA=91.0:5.0:4.0 (prepared in NMP)
  "LTO PAA-NMP" (FIG. 6): LFP:Carbon Black: PAA=90.0:5.0:5.0 (prepared in NMP)

Figure 3:
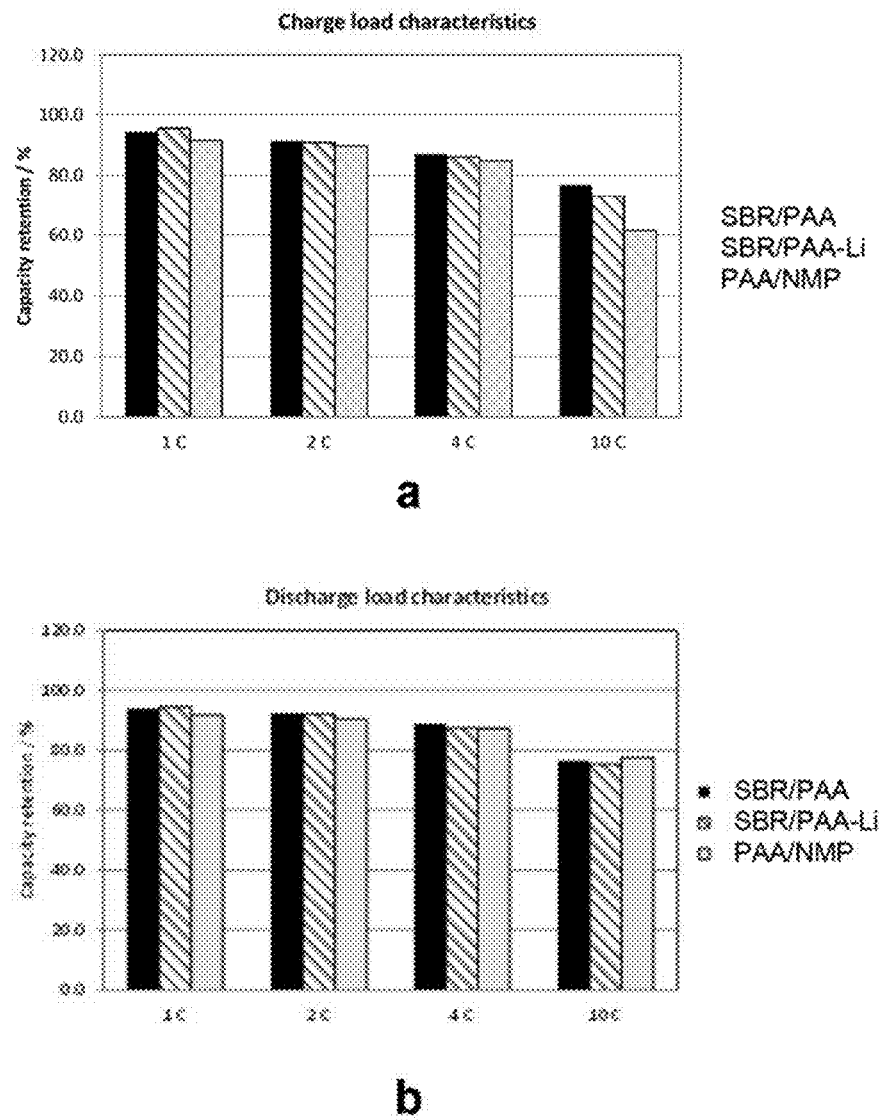
FIG. 3 displays a graph of the charge (a) and discharge (b) load characteristics of the LFP electrodes. The capacity retention was evaluated at different charge and discharge rates (1 C, 2 C, 4 C and 10 C). The results are presented for LFP-SBR/PAA, LFP-SBR/PAA-Li and LFP-PAA/NMP.

FIG. 3 showcase the charge (a) and discharge (b) load characteristics of the LFP electrodes. The capacity retention was evaluated at different charge and discharge rates (1 C, 2 C, 4 C and 10 C). The graph compares the capacity retention (%) for LFP-SBR/PAA, LFP-SBR/PAA-Li and LFP-PAA-NMP. The solid ratio used in FIG. 3 was "LFP PAA-NMP": LFP:Carbon Black:PAA=91.0:5.0:4.0.

Table 2 displays the charge and discharge efficiency % for the formation at 0.3 mA and the nominal charge/discharge efficiency % at 0.6 mA for the mixture of for LFP-SBR/PAA, LFP-SBR/PAA-Li and LFP-PAA-NMP.

TABLE 2

Charge and discharge capacity and efficiency

|  | Formation at 0.3 mA | | | Nominal charge & discharge at 0.6 mA | | |
|---|---|---|---|---|---|---|
|  | Charge capacity/ mAhg$^{-1}$ | Discharge capacity/ mAhg$^{-1}$ | Charge discharge Efficiency/% | Charge capacity/ mAhg$^{-1}$ | Discharge capacity/ mAhg$^{-1}$ | Charge Discharge Efficiency/% |
| SBR/PAA | 2.1 | 2.0 | 97.9 | 2.1 | 2.0 | 98.8 |
| SBR/PAA-Li | 2.4 | 2.4 | 98.1 | 2.4 | 2.4 | 99.0 |
| PAA/NMP | 2.5 | 2.4 | 97.3 | 2.4 | 2.4 | 98.6 |

Figure 4:
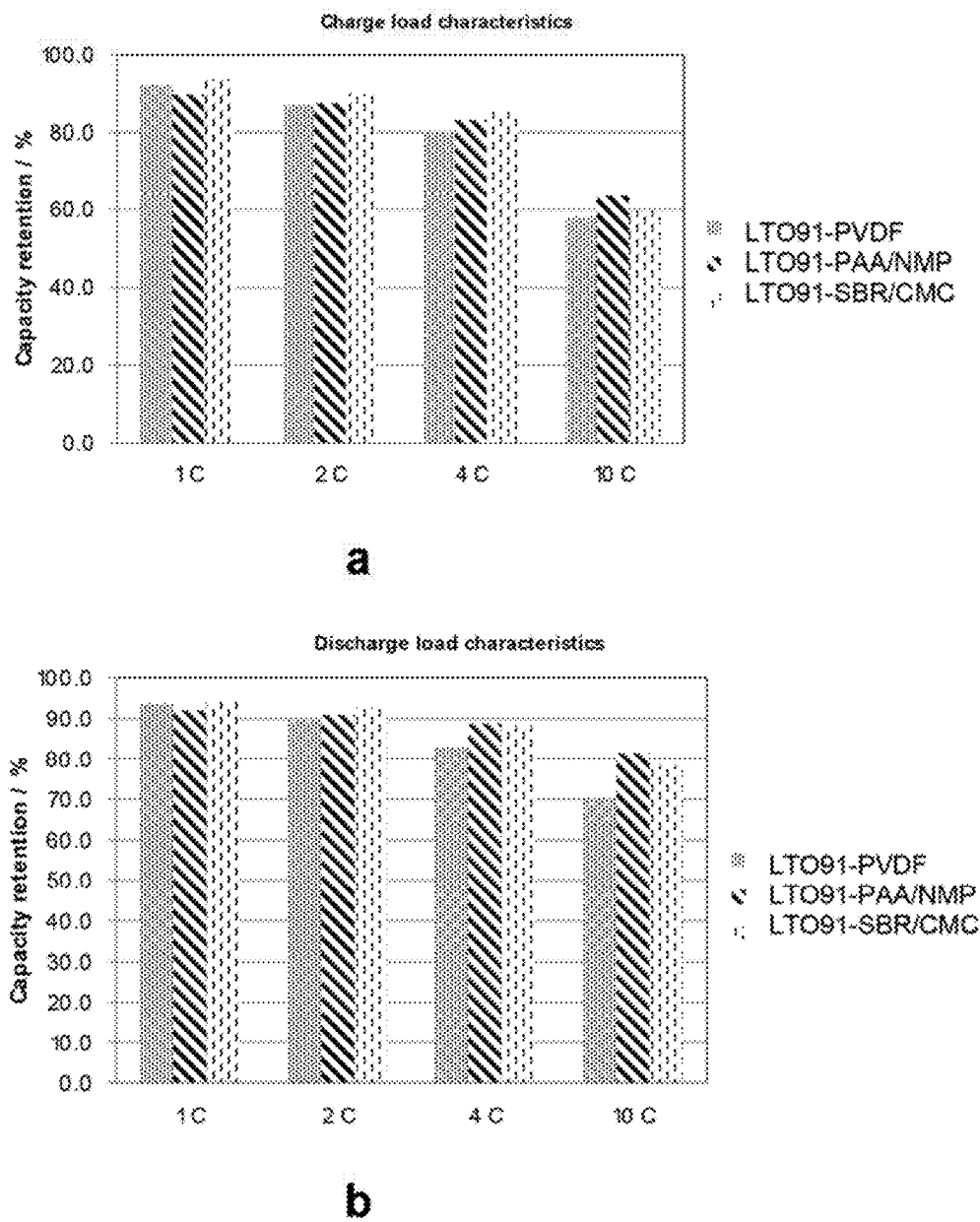
FIG. 4 displays a graph of the charge (a) and discharge (b) load characteristics of the LTO electrodes. The capacity retention was evaluated at different charge and discharge rates (1 C, 2 C, 4 C and 10 C). The results are presented for LTO-PVDF, LTO-PAA/NMP and LTO-SBR/CMC.

The charge (a) and discharge (b) load characteristics of the LTO electrodes are displayed in FIG. 4. The capacity retention was evaluated at different charge and discharge rates (1 C, 2 C, 4 C and 10 C). The graph compares results for LTO-PVDF or LTO-PAA/NMP and LTO-SBR/CMC. A clear improvement in capacity retention is notable at high rate of charge and discharge (10 C) for the PAA electrode in comparison with LTO-PVDF and LTO-SBR/CMC. The solid ratio used in FIG. 4 was "LTO PAA-NMP": LFP: Carbon Black:PAA=91.0:5.0:4.0.

Table 3 including the charge/discharge efficiency % for the formation at 0.25 mA and the nominal charge/discharge efficiency % at 0.5 mA for the LTO-PVDF reference, the LTO-PAA/NMP and the LTO-SBR/CMC.

TABLE 3

Charge and discharge capacities

| | Formation at 0.25 mA | | | Nominal charge & discharge at 0.5 mA | | |
|---|---|---|---|---|---|---|
| | Charge capacity/ mAhg$^{-1}$ | Discharge capacity/ mAhg$^{-1}$ | Charge discharge Efficiency/% | Charge capacity/ mAhg$^{-1}$ | Discharge capacity/ mAhg$^{-1}$ | Charge Discharge Efficiency/% |
| Reference | 2.5 | 2.4 | 96.8 | 2.4 | 2.4 | 97.9 |
| PAANMP | 2.5 | 2.4 | 95.7 | 2.4 | 2.4 | 98.9 |
| SBR/CMC | 2.5 | 2.4 | 97.0 | 2.4 | 2.4 | 98.7 |

Figure 5:
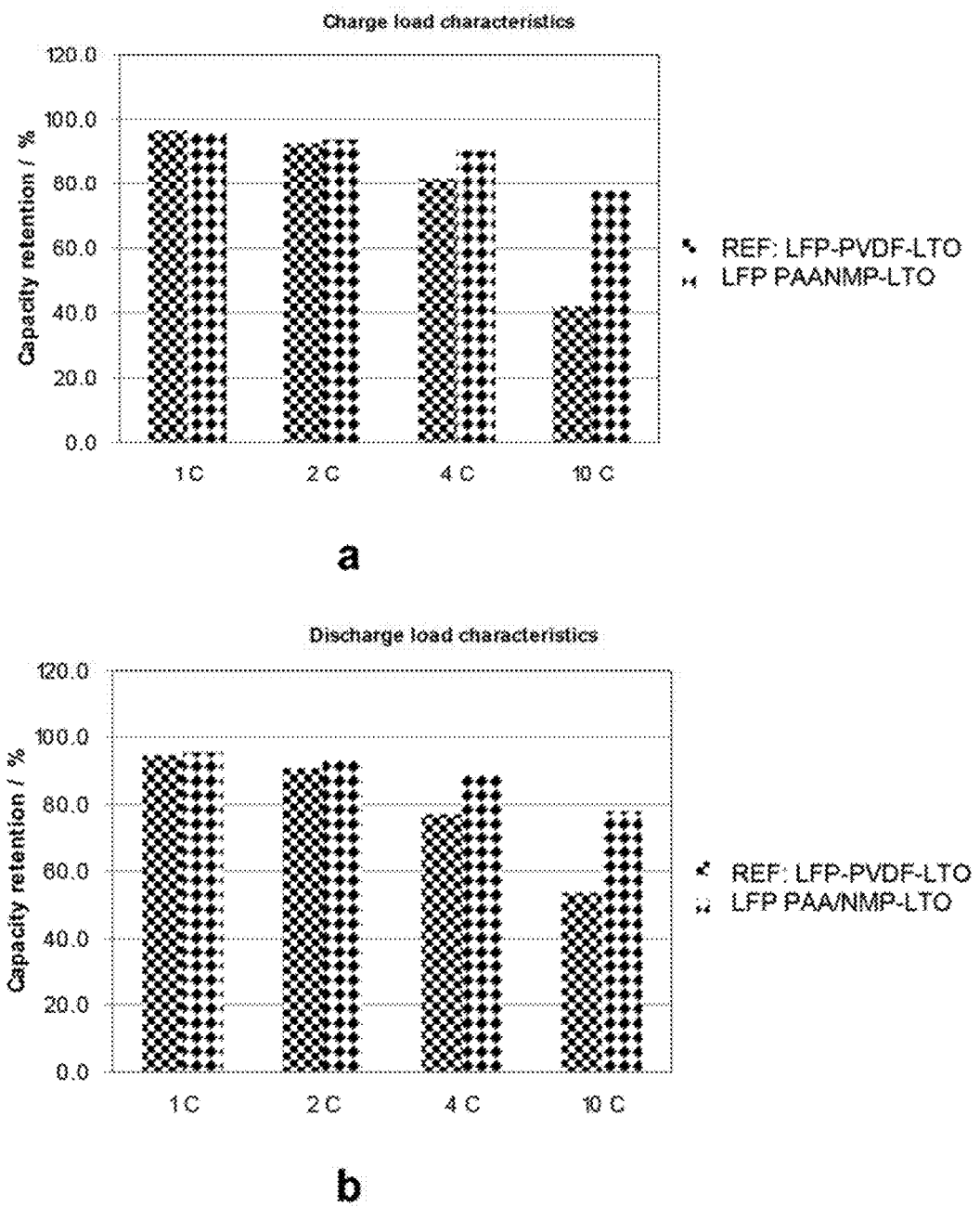
FIG. 5 displays a graph of the charge (a) and discharge (b) load characteristics of LFP-LTO cells. The capacity retention was evaluated at different charge and discharge rates (1 C, 2 C, 4 C and 10 C). The results are presented for the reference LFP-PVDF-LTO and the LFP-PAA-NMP-LTO cells.

The charge (a) and discharge (b) load characteristics of LFP-LTO cells are presented in FIG. 5. The capacity retention was evaluated at different charge and discharge rates (1 C, 2 C, 4 C and 10 C). FIG. 5 showcase results for the LFP-PVDF-LTO reference in comparison with LFP-PAA/NMP-LTO cell. Again, a significant improvement in capacity retention at high rate of charge and discharge (4 C and 10 C) can be observed for LFP-PAA/NMP-LTO cell in comparison with the reference.

Figure 6:
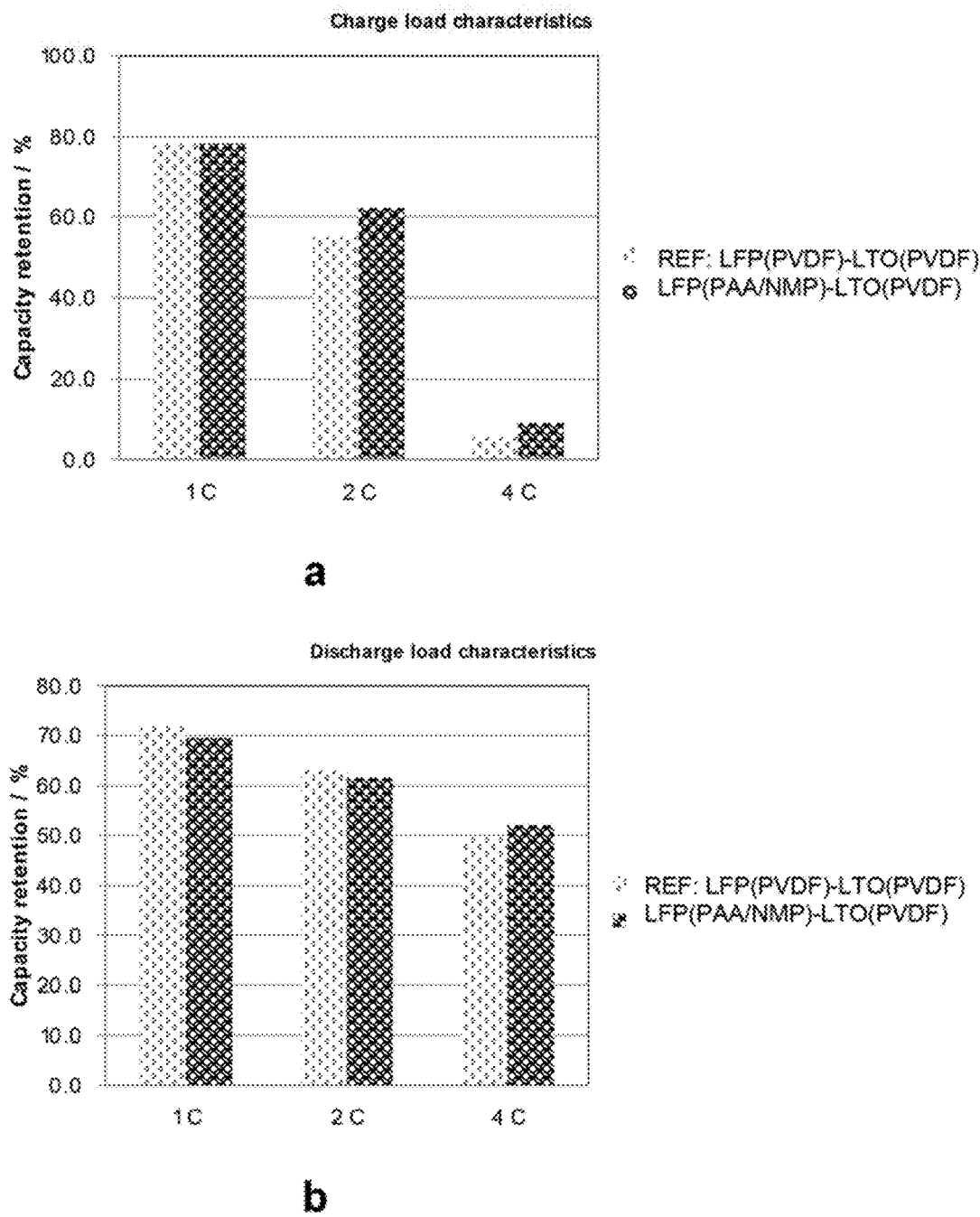
FIG. 6 displays a graph of the charge (a) and discharge (b) load characteristics of LFP-LTO cells. The capacity retention was evaluated at different charge and discharge rates (1 C, 2 C and 4 C). The results are presented for the reference LFP(PVDF)-LTO(PVDF) and the LFP(PAA-NMP)-LTO (PVDF) cells.

The graph of the charge (a) and discharge (b) load characteristics of LFP-LTO cells is presented in FIG. 6. The capacity retention was evaluated at different charge and discharge rates (1 C, 2 C and 4 C). The results are presented for the LFP(PVDF)-LTO(PVDF) reference and the LFP(PAA-NMP)-LTO(PVDF) cell. Once more, a significant improvement in capacity retention at high rate of charge and discharge (4 C) can be observed for the PAA containing cell in comparison with the PVDF reference. Hence, demonstrating that the presence of PAA in the binder plays a significant role in enhancing transportation of lithium.

LFP-LTO had the following compositions:
"LFP PAA-NMP": LFP:Carbon Black:PAA=90.0:5.0:5.0
"LTO PAA-NMP": LFP:Carbon Black:PAA=90.0:5.0:5.0

Numerous modifications could be made to any of the embodiments described above without departing from the scope of the present invention. Any references, patents or scientific literature documents referred to in this application are incorporated herein by reference in their entirety for all purposes.

The invention claimed is:

1. An electrode material comprising particles of an electrochemically active material dispersed in a polymer binder, wherein the polymer binder consists of:
   i. a mixture consisting of an aqueous binder and an acidic polymer;
   ii. an acidic polymer; or
   iii. a mixture consisting of a non-aqueous binder and an acidic polymer;

wherein the acidic polymer is selected from poly(acrylic acid), poly(methacrylic acid) and combinations thereof and has an average molecular weight within the range of from about 200 000 g/mol to about 600 000 g/mol.

2. The electrode material of claim 1, wherein the acidic polymer is poly(methacrylic acid).

3. The electrode material of claim 1, wherein the acidic polymer is poly(acrylic acid).

4. The electrode material of claim 1, wherein the polymer binder is (i) a mixture consisting of an aqueous binder and an acidic polymer, and the aqueous binder is selected from SBR (styrene butadiene rubber), NBR (butadiene acrylonitrile rubber), HNBR (hydrogenated NBR), CHR (epichlorohydrin rubber), ACM (acrylate rubber), and combinations thereof.

5. The electrode material of claim 4, wherein the aqueous binder comprises SBR (styrene butadiene rubber) or the aqueous binder is SBR (styrene butadiene rubber).

6. The electrode material of claim 1, wherein the polymer binder is (i) or (iii) and the ratio (aqueous binder):(acidic polymer) or (non-aqueous binder):(acidic polymer) is within the range of from about 1:8 to about 8:1, or from about 1:5 to about 5:1, or from about 1:3 to about 3:1.

7. The electrode material of claim 1, wherein the acidic polymer further comprises lithium ions.

8. The electrode material of claim 1, wherein the electrochemically active material comprises a material selected from the group consisting of titanates, lithium titanates, lithium metal phosphates, vanadium oxides, lithium metal oxides, and combinations thereof.

9. The electrode material of claim 8, wherein the electrochemically active material is selected from $TiO_2$, $Li_2TiO_3$, $Li_4Ti_5O_{12}$, $H_2Ti_5O_{11}$ and $H_2Ti_4O_9$, or a combination thereof, $LiM'PO_4$ wherein M' is Fe, Ni, Mn, Co, or a combination thereof, $LiV_3O_8$, $V_2O_5$, $LiMn_2O_4$, $LiM''O_2$, wherein M'' is Mn, Co, Ni, or a combination thereof, $Li(NiM''')O_2$, wherein M''' is Mn, Co, Al, Fe, Cr, Ti, or Zr, and combinations thereof.

10. The electrode material of claim 8, wherein the electrochemically active material is selected from lithium titanates and lithium metal phosphates.

11. The electrode material of claim 1, wherein said particles further comprise a carbon coating.

12. A process for producing an electrode comprising an electrode material as defined in claim 1, comprising the steps of:
   a) mixing, in any order:
      i. particles of electrochemically active material, the mixture consisting of the aqueous binder and the acidic polymer in an aqueous solvent to obtain a slurry;

ii. particles of electrochemically active material and the binder consisting of the acidic polymer in a solvent to obtain a slurry; or
iii. particles of electrochemically active material, the mixture consisting of the non-aqueous binder and the acidic polymer in an unreactive organic solvent to obtain a slurry;

b) casting the slurry of step (a) on a current collector; and
c) drying the casted slurry to obtain an electrode.

13. The process of claim 12, further comprising a step of neutralizing the acidic polymer prior to step (a) with a lithium-containing base such as lithium hydroxide.

14. The process of claim 12, wherein the current collector is aluminum or an alloy having aluminum as the main component.

15. The process of claim 12, wherein the solvent in step (a)(ii) is an aqueous solvent.

16. The process of claim 12, wherein the solvent in step (a)(ii) or (a)(iii) is an unreactive organic solvent.

17. The electrode material of claim 1, wherein the polymer binder is (iii) a mixture consisting of a non-aqueous binder and an acidic polymer, and the non-aqueous binder is selected from fluorinated binders.

18. The electrode material of claim 17, wherein the fluorinated binder comprises PVDF or the fluorinated binder is PVDF.

19. An electrode comprising the electrode material as defined in claim 1, on a current collector, preferably the current collector is aluminum or an alloy having aluminum as the main component.

20. An electrochemical cell comprising an electrode as defined in claim 19, an electrolyte and a counter-electrode.

21. The electrode material of claim 11, wherein the carbon coating is a nano-layer of carbon comprising fibers on the surface of the particles and/or the carbon coating comprises a polyaromatic structure of graphene comprising heteroatoms selected from oxygen, nitrogen, sulfur and combinations thereof.

* * * * *